United States Patent [19]

Wyder

[11] 4,437,623

[45] Mar. 20, 1984

[54] INTEGRATED WEBLOCKER WITH PROGRAM PAWL RETRACTOR

[75] Inventor: Manfred Wyder, Rowland Heights, Calif.

[73] Assignee: American Safety Equipment Corporation, Troy, Mich.

[21] Appl. No.: 420,713

[22] Filed: Sep. 21, 1982

[51] Int. Cl.³ ..................... A62B 35/02; B65H 75/48
[52] U.S. Cl. ......................... 242/107.2; 242/107.4 A
[58] Field of Search ................. 242/107.2, 107.4 R, 242/107.4 A, 107.4 B, 107.4 C, 107.4 D, 107.4 E; 280/806; 297/478, 480

[56] References Cited

U.S. PATENT DOCUMENTS

| | | |
|---|---|---|
| 3,450,368 | 6/1969 | Glauser et al. |
| 3,504,867 | 6/1970 | Stevenson |
| 3,834,646 | 9/1974 | Heath |
| 3,918,658 | 9/1976 | Beller |
| 4,241,886 | 12/1980 | Maekawa ............ 242/107.2 |
| 4,249,708 | 2/1981 | Asano .................. 242/107.2 |
| 4,328,934 | 5/1982 | Ahad .................. 242/107.4 A |

FOREIGN PATENT DOCUMENTS

| | | |
|---|---|---|
| 2215846 | 3/1974 | France |
| 2226840 | 10/1974 | France |
| 2383677 | 2/1978 | France |
| 532494 | 2/1973 | Sweden |

Primary Examiner—John M. Jillions
Attorney, Agent, or Firm—Poms, Smith, Lande & Rose

[57] ABSTRACT

An improved dual locking safety belt retractor mechanism is disclosed having a frame, a spool of safety belt webbing rotatably carried with respect to the frame by a reel, the reel being provided with a primary ratchet wheel and a deformable program ratchet wheel. An inertia-activated pawl assembly carries a primary pawl member and a deformable programming pawl for engagement with the ratchet wheels in a programmed manner for preventing false-locking conditions. The pawl assembly is mounted by the shaft of the safety belt webbing reel for limited rotation with respect to the retractor frame between deactivated and activated positions in response to protractive forces exerted on the safety belt. A weblocker is provided in front of the retractor reel in which the safety belt webbing passes between a pair of clamping wedges which when actuated by a weblocker actuator in response to rotation of the pawl assembly to the actuated position causes the clamping wedges to slide along respective inclined surfaces in such manner that the wedges move inward with respect to one-another and effectively and immediately clamp the safety belt webbing passing therebetween against further protractive motion.

10 Claims, 6 Drawing Figures

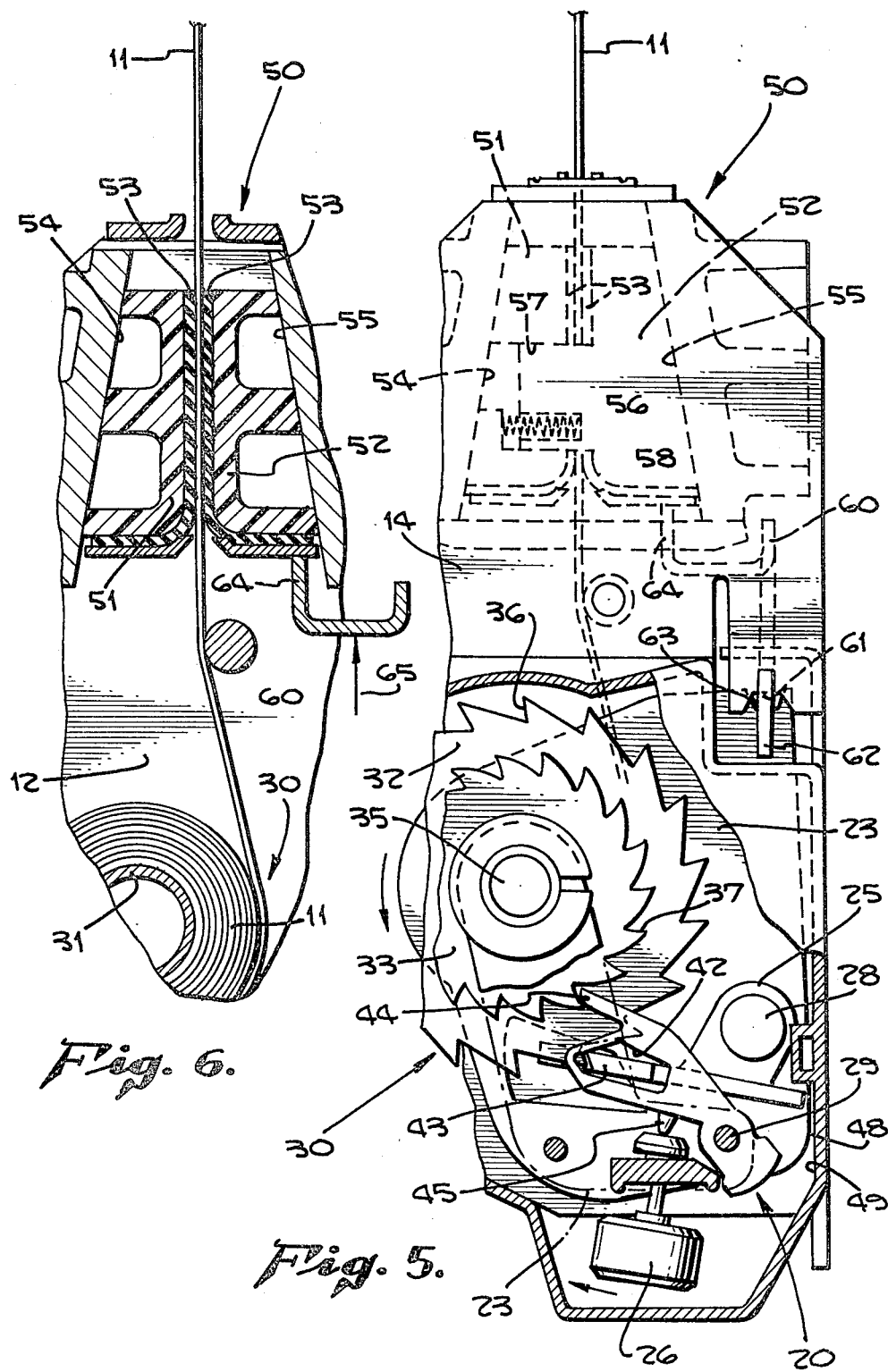

INTEGRATED WEBLOCKER WITH PROGRAM PAWL RETRACTOR

The present invention relates generally to safety belt webbing emergency locking apparatus for use with safety belt systems employed in automobiles for the restraint of passengers during emergency conditions and, more particularly, to a dual webbing locking and reel locking apparatus utilizing a single inertia sensor for use with a single safety belt retractor employing a reel from which the safety belt is protracted and retracted.

BACKGROUND OF THE INVENTION

Safety belt restraint devices, particularly those with inertia-sensitive locking means, have been known in the art for several years. There is constant development within this industry to produce improved devices which will restrain a passenger in an emergency with an economy of moving parts and at minimal costs while having these passenger restraint devices operate with a minimal interference with the occupant in order to promote more frequent use of the restraint devices.

Many safety belt systems which are known in the art utilize a spring-biased reel mounted within a retractor mechanism about which is wound a protractable length of seat belt webbing material. In one class of these restraint devices, the occupant may freely cause protraction and retraction of the seat belt as the occupant moves within the vehicle seat during normal conditions in a relatively unconfined manner. During emergency conditions, these retractor mechanisms are provided with an inertia sensor for sensing the emergency condition and prevent further protraction of the seat belt once the emergency condition is encountered thereby restraining the occupant for the duration of the emergency.

One such retraction device incorporates as a main feature a pawl and ratchet-wheel construction for locking the spool or reel about which the safety belt is wound against further protractive rotation. As disclosed in U.S. Pat. No. 3,918,658 issued to Herbert R. Beller on Nov. 11, 1975 and entitled "Seat Belt Retractor Having Inertial Device Activated by Two Stimuli", a retractor mechanism is disclosed which includes a retractor spool about which a seat belt webbing is wound, a first inertia sensor which comprises a pendulum which is responsive to the inertia of the vehicle, a second inertia sensor which is responsive to excessively rapid protractive rotation of the spool, and a pawl which, in this case, is responsive to both of the inertia sensing devices to cause engagement with the ratchet teeth of the spool and thereby prevent further protractive rotation of the spool.

One of the disadvantages of spool locking retractor devices is that even though the reel or spool itself becomes locked during an emergency condition, a certain amount of protraction of the safety belt can still occur depending on the manner in which the belt is wound about the reel and its relative compactness. In other words, the belt may slide along itself further compacting the layers wound on the reel providing an additional amount of slack to the belt.

In a co-pending application, Ser. No. 227,275 filed Jan. 22, 1981 by Avraham Ziv and entitled "Safety Belt Webbing Emergency Locking Apparatus", assigned to the common assignee of this invention and incorporated herein by reference, an improvement to such devices was disclosed by providing a single clamping wedge disposed at a location between the retractor reel and the vehicle occupant and having the safety belt passing therethrough. In the apparatus of that invention, in addition to the inertia-responsive device for causing lock-up of the retractor reel itself, a second inertia responsive device was provided for activating the clamping wedge which more directly clamped the safety belt preventing any further protraction whenever the second inertia sensor encountered a level of inertia greater than that necessary to cause lockup of the reel-associated sensor. In this manner, in more severe emergencies, an immediate and more reliable lock-up of the belt was accomplished.

In a subsequent co-pending application, Ser. No. 343,896 filed Jan. 29, 1982, by Avraham Ziv and entitled "Protractive Force Responsive Safety Belt Locking Apparatus", assigned to the common assignee of this invention and incorporated herein by reference, it was further identified that in a dual locking retractor such as the one just described, after a primary lock-up of the retractor spool and before the greater threshold vehicle inertia was encountered to trigger the belt clamping wedge, differing amounts of slack would play out of the locked reel of wound webbing material depending upon the weight of the occupant. This weight or force responsive protraction would vary independent of the degree of vehicle inertia encountered in the emergency condition and thus a non-uniform degree of restraint is provided by the previous apparatus. In the apparatus of the subsequent invention, the clamping wedge is responsive to that weight or force which the individual imparts to the seat belt during the emergency condition thereby causing immediate and assured lock-up of the safety belt webbing. Locking of the webbing would thus occur in response to forces exerted on that webbing such as during a slow-developing emergency condition where the greater vehicle threshold inertia of the previous-described invention would not be achieved. More specifically, in the apparatus of the later invention, a pendulum-type inertia sensor senses a first level of vehicle inertia associated with an emergency condition and causes lock-up of the spool in the conventional manner. Further forces on the vehicle occupant associated with the emergency condition causes the safety belt to be tensioned such that protractive slipping of the winds of webbing about the locked spool might cause further protraction or slackening of the belt. Forces associated with this further protraction are transmitted to the spool which is mounted in a retractor assembly which is slideably attached to the retractor frame and biased toward an unlocked position. The increasing force upon the safety belt which would otherwise cause further belt slippage and protraction, instead causes the retractor simply to slide relative to the frame and this sliding, in turn, activates a clamping wedge similar to that previously described thereby causing an immediate and an assured clamping of the safety belt and preventing further protraction even though the windings of the belt around the reel have not achieved full compactness and further slippage would have been possible.

While the apparatus of the last-described invention is well suited for its purpose, the use of a sliding mounting apparatus for the retractor reel requires a significant number of moving parts, is costly to manufacture and assemble, and required movement of the retractor. Wherefore, it is an object of the present invention to provide an alternative embodiment to the invention of the aforementioned application which alternate embodiment is similarly responsive to protraction forces on the seat belt webbing itself following primary lock-up of the reel but which eliminates the requirement of a sliding construction and adds a geometry and design affording economical manufacture.

It is a further object of the present invention to adapt the alternative embodiment to utilize and adapt a feature found for example in FIG. 3 of U.S. No. 3,834,646 filed Sept. 10, 1974 by Robert B. Heath and entitled "Take-Up Spool Latch". In the apparatus of that invention, first and second sets of pawls and ratchet wheels are utilized in association with a pendulum-type inertia sensor and locking ratchet wheel to prevent a false-locking condition. A condition in which the primary pawl and ratchet wheel engage in a tip-to-tip relationship or a premature release of lock-up occurs. The apparatus of that invention provides a second programming pawl and ratchet assembly formed of deformable plastic material which guides the engagement of the primary pawl and ratchet wheel into a meshed lock-up assured relationship. Therefore, it is a further object of the present invention to adapt the teachings of that patent into the aforementioned alternative embodiment, particularly since the integrated dual locking feature of the locking reel plus the clamping wedge or weblocker in this alternative embodiment are to be responsive to a single vehicle inertia sensor or pendulum mass.

SUMMARY OF THE INVENTION

The foregoing objects have been met in an inertia responsive locking safety belt retractor including integrated weblocking means, said retractor having a frame mounted to the vehicle, a toothed retractor reel rotatably mounted to the frame and having a safety belt webbing wound thereon for protraction and retraction, a pawl assembly rotatably mounted to the frame by the retractable wheel and having a limited range of rotational motion relative to the frame, an inertia-activated pawl carried by said pawl assembly for engaging the toothed reel to prevent protractive rotation in an emergency, the pawl assembly being rotatable in response to protractive forces exerted on the safety belt when the pawl is in locking engagement with the reel, and webbing clamping means carried by the frame and having the safety belt passing operably therethrough for selectively clamping the safety belt against further movement relative to the clamping means in response to a predetermined limited rotation of the pawl assembly by protractive forces on the safety belt in excess of a predetermined threshold amount.

More specifically, a pair of wedge-shaped clamp members are mounted in front of the retractor reel and have the seat belt webbing passing therebetween. The retractor reel has axially extending shaft portions which are rotatably mounted to the retractor frame. The pawl assembly is rotatably-mounted by journal surfaces to the shaft portions of the retractor reel such that the pawl assembly may pivot about the shaft portions relative to the retractor frame. Further, the pawl assembly is spring-biased to a deactivated position. Upon lock-up due to the primary inertia-responsive mechanism, the protractive force on the seat belt to its tangential attachment to the spool of seat belt webbing material tends to rotate the combined reel and pawl assembly in a protractive direction. Upon the protracting force exceeding the bias force of a spring resisting protractive rotation, the pawl assembly rotates in such manner as to engage a lever which causes the pair of wedge-shaped clamp members to clamp and hold the seat belt. In this manner a dual locking function is accomplished by the inertia-sensitive pawl and ratchet assembly and by the weblocker formed by the pair of wedge-shaped clamp members. While it is contemplated that this embodiment could include a separate spring-loaded locking mechanism which is tripped by the movement of the pawl assembly to a locking position, requiring it to be reset, further disclosure is in regard to a preferred embodiment in which the rotational movement of the pawl assembly directly activates the weblocker and, in response to biasing springs, automatically allows it to be deactivated at the termination of the emergency condition and release of protractive force on the safety belt webbing.

In an additional feature of this embodiment, a programmed pawl assembly is employed to assure lock-up of the primary inertia-responsive mechanism during an emergency condition thereby minimizing false-locking conditions. A false-locking condition occurs when the inertia-responsive pawl engages a tooth of a retractor ratchet wheel in a tip-to-tip relationship. During the rapid application and subsidence of inertial forces to the inertial mass during emergency conditions, protraction of the safety belt may not coincide with the lifting of the pawl toward the ratchet wheel in response to the inertia sensor and thus lock-up might be delayed and excessive protraction of the safety belt might occur before lock-up occurs.

According to this feature, a second ratchet wheel and pawl is provided in association with the retractor reel, the second ratchet wheel and pawl being formed of an elastomeric material which is less likely to rebound during sudden jarring forces experienced by the vehicle and being aligned to minimize the effects of the tip-to-tip condition. Engagement of the deformable pawl with the deformable ratchet wheel in response to the inertia sensor with the addition of slight protractive rotation of the reel causes the deformable pawl to be further lifted radially inward with respect to the reel due to its engagement with one of the teeth of the deformable ratchet wheel and thereby lifts the primary pawl into engagement with the first-mentioned toothed retractor reel in a programmed manner such that a tip-to-tip false locking relationship cannot occur between the primary pawl and ratchet wheel. Further, the pawl is retained in continuous engagement with the primary ratchet wheel in response to the elasticity of the deformable pawl even though forces on the inertia sensor have subsided and until such time as the minimal protractive forces on the seat belt webbing have been released.

The combination of the assured lock-up feature of the programmed pawl assembly with the dual locking features, and in particular, the immediate and assured locking of the weblocker apparatus produces a vehicle retractor mechanism having much greater reliability and having a reduced cost of manufacture relative to many other retractor systems having similar features.

BRIEF DESCRIPTION OF THE DRAWINGS

FIG. 5 is a partially cut-away side view similar to FIG. 2 of a portion of the apparatus of FIG. 1 showing the seat belt retractor of FIG. 2 in a locked-up condition.

FIG. 6 is a side sectional view similar to FIG. 3 showing the seat belt retractor of FIG. 1 in the locked-up condition of FIG. 5.

DETAILED DESCRIPTION OF A PREFERRED EMBODIMENT

Figure 1:
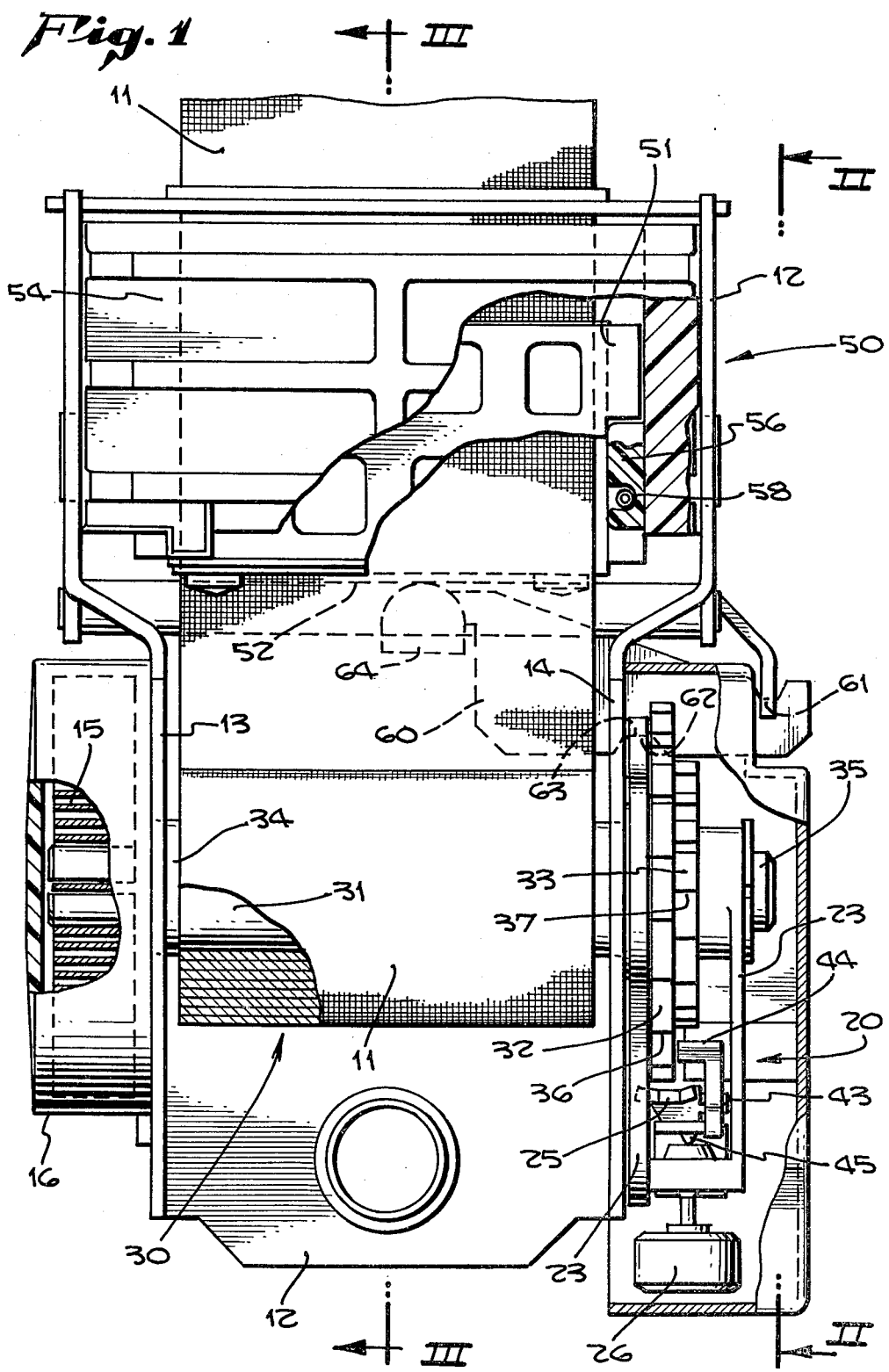
FIG. 1 is a partially cut-away front elevation of a seat belt retractor mechanism incorporating a preferred embodiment of the present invention.
Figure 2:
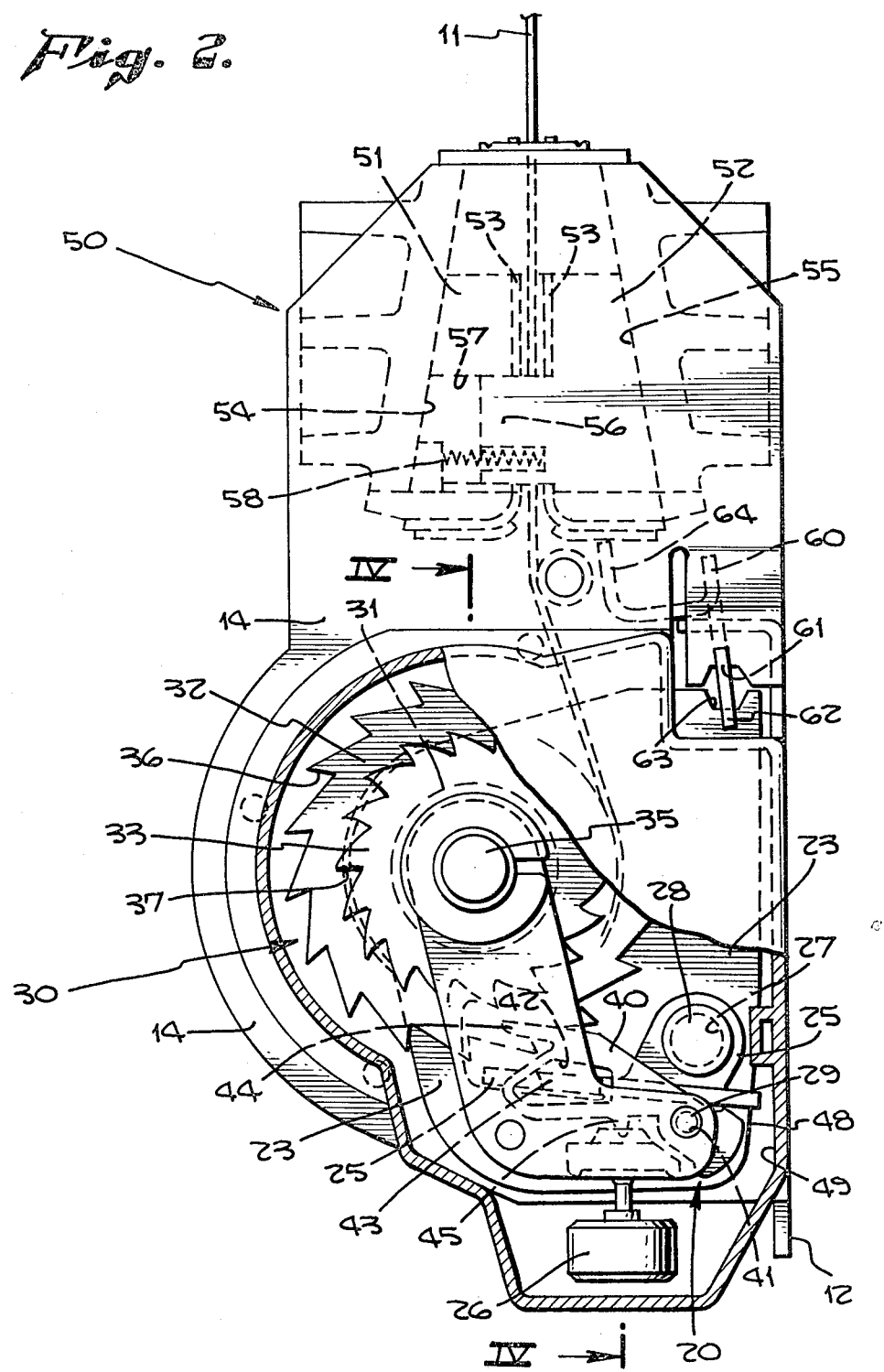
FIG. 2 is a partially cut-away side view of the seat belt retractor of FIG. 1 taken in section along the plane II—II of FIG. 1.

Referring initially to FIGS. 1 and 2, a safety belt retractor 10 is shown incorporating the present invention in a preferred embodiment. The retractor 10 comprises a frame 12 adapted to be mounted to the vehicle in a convenient location, for example vertically mounted at the vehicle door post. An inertia-activated pawl assembly, generally indicated as 20, is rotatably mounted relative to frame 12 in a manner which will be further described. Mounted in association with the pawl assembly 20 is the reel assembly 30 which comprises a central spindle 31 positioned between two sidewalls 13 and 14 of the retractor frame 12 which together form a spool about which the safety belt webbing 11 may be retractably wound. The reel assembly 10 includes axially extending shaft portions 34 and 35 which extend through and are journal-mounted by parallel side walls 13 and 14 of retractor frame 12. In addition, upon one of the shaft portions 35 is further fixedly mounted a ratchet wheel 32 which serves as the primary ratchet wheel for the primary inertia-sensitive locking mechanism.

The inertia-activated pawl assembly 20 which is rotationally mounted relative to frame 12 by shaft portion 35 and journal surfaces 21 and 22 permits a limited range of rotation relative to the retractor frame 12 between a deactivated position shown in FIG. 2 and an activated position shown in FIG. 5. A spring (not shown) is contained within retractor frame 12 for biasing the inertia-activated pawl assembly 20 to rotate toward and maintain the deactivated position. The spring has a predetermined biasing force which determines the threshold protractive force required to be exerted on the seat belt webbing 11 in order to cause the pawl assembly 20 to rotate to the activated position. The effects of this force and rotation will be more fully described later.

The seat belt webbing 11 is attached to and wound about the spindle 31 of the reel assembly 30 such that as the seat belt webbing 11 is protracted, a spool-biasing spring 15 contained within housing 16 of retractor frame 12 is wound tighter thereby biasing the reel assembly 30 to retract the seat belt webbing 11 by revolving in the opposite direction as the protracting force thereon is released. As shown in FIG. 2, the safety belt webbing 11 is wound about the spindle 31 such that a protractive force on the webbing would cause a counter-clockwise rotation of the reel assembly. Consistent with this assembly, a counter-clockwise limited rotation of the pawl assembly 20 would be associated with movement from the deactivated condition of FIG. 2 to the activated condition of FIG. 5.

Pawl assembly 20 further includes a primary pawl member 25 disposed in relation to multiple teeth 36 of the primary ratchet wheel 32 of reel assembly 30 such that it may be forced into engagement with said teeth and thereby lock the reel assembly 30 against further protractive rotation in response to inertial forces exceeding a preselected level being exerted upon an inertial mass, in this embodiment a pendulum 26, as during an emergency condition.

More particularly, in conformance with the programmed pawl feature of the present invention, the reel assembly 30 is further provided with a deformable program ratchet wheel 33 fixedly mounted adjacent to primary ratchet wheel 32 upon shaft portion 35. The deformable program ratchet wheel 33 contains multiple teeth 37 about its periphery similar to primary ratchet wheel 32. Deformable ratchet wheel 33, however, is formed of a lightweight and inexpensive elastomeric material such as, in the preferred example, Delrin. Within the inertia-activated pawl assembly 20, the primary pawl member 25 is provided with an aperture 27 such that it may be pivotally mounted with respect to pawl assembly frame 23 about a post 28 of that frame. By this assembly, the primary pawl member 25 is capable of pivoting about post 28 such that a portion of the primary pawl member 25 may move radially inward and outward with respect to the reel assembly 30 and thereby selectably engage the multiple teeth 36 of the primary ratchet wheel 32.

Similarly, a deformable programming pawl 40 is also carried by the frame 23 of the pawl assembly 40. More specifically, the deformable programming pawl 40 is provided with a pivot aperture 41 such that it may be pivotally mounted with respect to frame 23 by a pivot 29 of that frame. The deformable programming pawl 40 may pivot about pivot 29 in such a manner that the engaging surface 44 of the pawl 40 may move radially toward and outward with respect to the reel assembly 30 such that the engaging surface 44 may selectively engage the multiple teeth 37 of the deformable program ratchet wheel 33 in a manner which will be described. The deformable program pawl 40 is further provided with a protrusion 45 for engaging the head of pendulum 26 or other inertia sensor to cause the deformable program pawl 40 to pivot about pivot 29 when vehicle inertia forces in excess of a preselected threshold amount are exerted upon the inertia sensor. Deformable program pawl 40 is provided with a cut-out 42 which cooperates with a laterally extending tongue portion 43 of primary pawl member 25. Similar to the deformable program ratchet wheel 33, deformable programming pawl 40 may be formed of a lightweight and inexpensive elastomeric material such as Delrin.

In accordance with the program feature of the pawl assembly, during operation, lock-up of the primary inertia-sensitive mechanism occurs in the following sequence. When vehicle inertial forces in excess of a preselected threshold level are experienced by the inertial mass or pendulum 26, that pendulum is tipped and thereby exerts a lifting pressure on protrusion 45 of the deformable programming pawl 40. This lifting causes deformable programming pawl 40 to pivot with respect to pawl assembly frame 23 about pivot 29 such that the engaging surface 44 of the deformable programming pawl 40 engages one of the multiple teeth 37 of the deformable program ratchet wheel 33. Once in this engaged position, a slight protraction of the seat belt webbing 11 causes a slight counter-clockwise rotation of the reel assembly 30 as particularly contemplated by the deformable nature of the programming pawl 40 and program ratchet wheel 33. This slight protractive rotation further pivots the deformable programming pawl 40 about its pivot 29 such that the lower surface of its cut-out 42 engages and lifts the laterally extending tongue 43 of the primary pawl member 25 such that that pawl member pivots about post 28 into direct and coordinated engagement with one of the multiple teeth 36 of the primary ratchet wheel 32. Since the primary pawl member 25 and the primary ratchet wheel 32 are formed of a load bearing material such as a metal, this engagement effectively locks the reel assembly 30 against further protractive rotation with respect to the pawl assembly 20. In this manner, the first of the dual emergency locking mechanisms for preventing safety belt protraction has been accomplished.

The exertion of further protractive force upon the seat belt webbing 11 by inertial forces on the vehicle occupant, due to the tangential winding of the belt 11 with respect to the reel assembly 30, causes a further rotative force or moment to the entire pawl assembly 20 in the counter-clockwise direction. When this moment exceeds a preselected level, the clockwise biasing of the pawl assembly spring (not shown) is overcome and the entire pawl assembly 20, in particular frame 23, experiences a limited rotation with respect to retractor frame 12 in the counterclockwise direction about journal surfaces 21 and 22 and shaft portion 35 from the deactivated position (FIG. 2) to the activated position (FIG. 5). In the activated position, an edge 48 of the frame 23 of the pawl assembly 20 abuts an interior surface 49 of retractor frame 12 thereby limiting further counterclockwise protractive rotation.

Figures 3, 4:
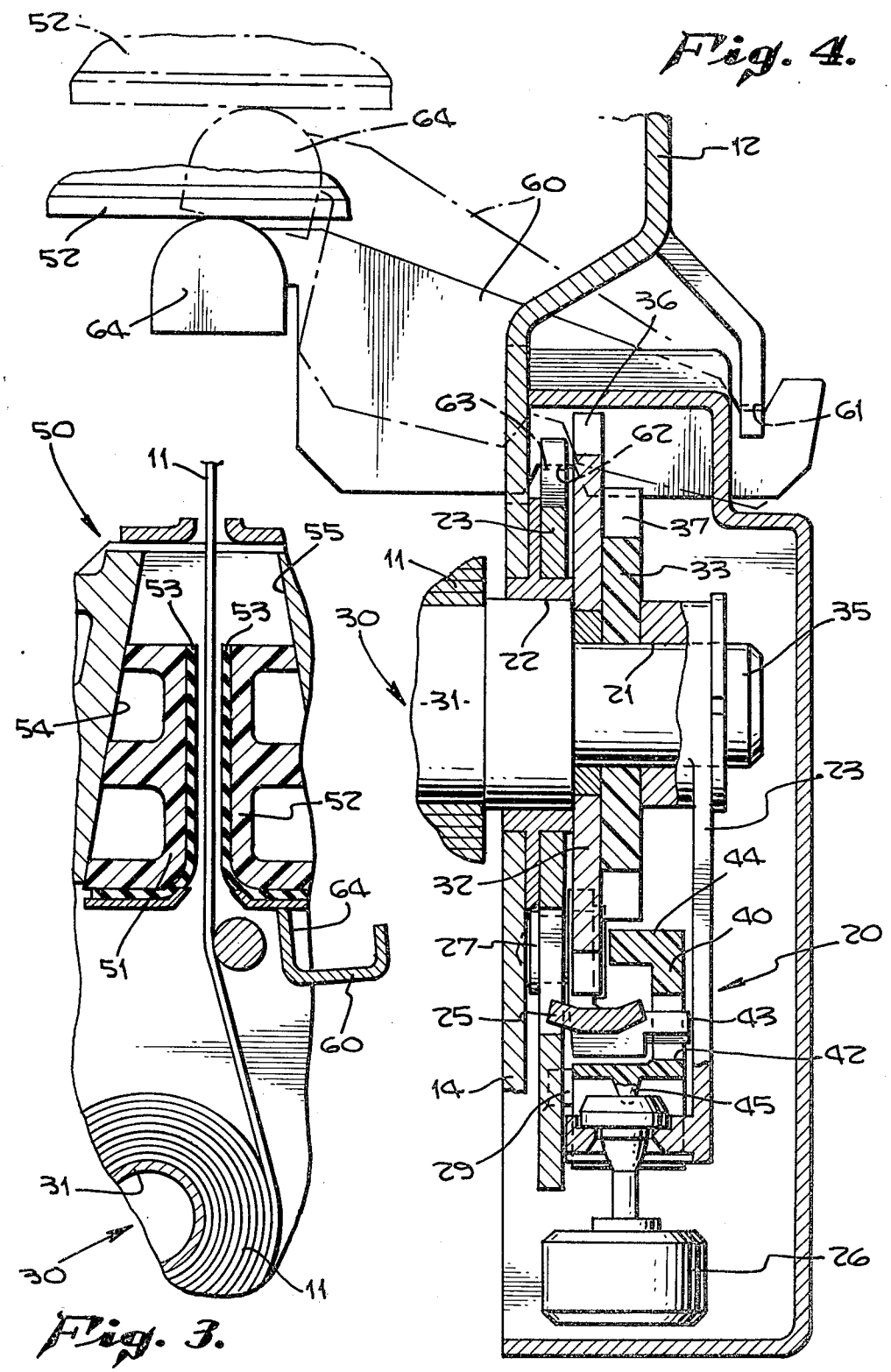
FIG. 3 is a side sectional view of the portion of the seat belt retractor of FIG. 1 taken in section along plane III—III of FIG. 1.
FIG. 4 is a front sectional view of a portion of the seat belt retractor of FIG. 1 taken in section along plane IV—IV of FIG. 2.

The second locking mechanism of the present invention comprises an integrated weblocker, generally indicated at 50 and best shown in FIGS. 3 and 6. The weblocker is positioned in front of the retractor reel assembly 30, in other words, between the reel assembly 30 and the vehicle occupant, such that the safety belt webbing 11 passes from the reel assembly 30 through the weblocker 50, and to the vehicle occupant. The weblocker 50 comprises clamping means which is carried by the frame 12 of the retractor for selectively clamping the safety belt against further movement relative to the clamping means in an immediate and assured manner. More particularly, the weblocker 50 has two opposing clamping wedges 51 and 52 which are provided with parallel and opposing gripping surfaces 53 between which passes the safety belt webbing 11. The clamping wedges 51 and 52 are positioned between inclined surfaces 54 and 55 of retractor frame 12 such that the spaced gripping surfaces 53 of the clamping wedges 51 and 52 are guided inward with respect to one-another into gripping relationship with the safety belt passing therebetween whenever the pair of clamping wedges 51 and 52 are translated along inclined surfaces 54 and 55 in the direction associated with further protraction of the safety belt webbing 11. By this arrangement, once the gripping surfaces 53 of clamping wedges 51 and 52 have become frictionally engaged with the safety belt webbing 11 as during a lock-up condition, further protractive forces on the safety belt webbing will tend to slide the clamping wedges 51 and 52 along the inclined surfaces 54 and 55 in a manner which even more effectively grips the safety belt webbing 11.

It is contemplated that the clamping wedges 51 and 52 translate or slide along the inclined surfaces 54 and 55 in the directions associated with protraction and retraction of the safety belt webbing in a coordinated manner. This is accomplished by the provision of a tongue 56 on one of the clamping wedges as particularly shown in FIG. 2 and a cooperating groove 57 on the other of the clamping wedges such that the two clamping wedges 51 and 52 may move only inward and outward with respect to one-another as guided by the inclined surfaces 54 and 55. Additionally, spring 58 is provided to bias the clamping wedges 51 and 52 in an outward or nongripping direction such that gripping occurs only when the clamping wedge assembly has been driven along the inclined surfaces in the direction associated with safety belt protraction.

A weblocker actuator 60, as best seen in FIG. 4, is provided for causing motion of the clamping wedges 51 and 52 in the direction associated with protraction of the safety belt webbing, hereinafter referred to as an upward or locking direction. The weblocker actuator 60 comprises a lever having a fulcrum 61 mounted by the frame 12 about which the weblocker actuator 60 pivots relative to retractor frame 12, a follower portion 62 which is engaged by a cam edge 62 of the rotatable frame 23 of the inertia-actuated pawl assembly 20 to cause the weblocker actuator 60 to pivot about fulcrum 61, and a wedge driving portion 64 which engages and drives the clamping wedges 51 and 52 in the locking direction.

In operation, after lock-up of the retractor reel assembly 30 by the primary lock-up mechanism and a further protractive force being exerted on the safety belt webbing 11 in excess of a preselected threshold amount, frame 23 of the pawl assembly 20 experiences a limited rotation in the manner previously described from the deactivated to the activated position. This rotation causes the cam edge 63 of frame 23 to engage follower portion 62 of the weblocker actuator 60 thereby causing the actuator to pivot about its fulcrum 61 such that wedge driving portion 64 drives the clamping wedges 51 and 52 in a locking direction. In response to the driving forces of the wedge driving portion 64, the weblocker 50 experiences an immediate and assured lock-up by which the clamping wedges 51 and 52 are driven by the wedge driving portions 64 in the locking direction, sliding along the inclined surfaces 54 and 55 of frame 12 such that the opposing gripping surfaces 53 are forced inward, overcoming the biasing of spring 58, and into gripping contact with the safety belt webbing 11 passing therebetween. Any further protractive force on the safety belt webbing 11, due to the contact with the gripping surfaces 53 and under the action of the inclined surfaces 54 and 55, simply causes the weblocker 50 to more securely grip the safety belt webbing and thereby prevent any further protractive motion. This locking action of weblocker 50 may best be seen in FIGS. 3 and 6 wherein from the unlocked condition of FIG. 3, an upward motion of wedge driving portion 64 in the locking direction shown by arrow 65 of FIG. 6 causes the clamping wedges 51 and 52 to slide along the inclined surfaces 54 and 55 and thus inward with respect to one-another and thus into gripping contact with the safety belt webbing 11 passing therebetween.

It can now be seen that the teachings of the present invention as illustrated by the foregoing description of a preferred exemplary embodiment produces a dual safety belt locking mechanism which is responsive to a single inertia sensor which detects emergency conditions by sensing inertial forces imparted to the vehicle in excess of a predetermined threshold. Further, once the emergency condition is sensed and the retractor spool is locked against further protractive rotation, further protraction of the safety belt without said rotation due to the release of slack and compression of windings of the belt webbing about the retractor reel is immediately and effectively prevented by actuation of a second lock-up mechanism, the weblocker, in response to protractive forces applied to the safety belt webbing itself in excess of a second preselected threshold amount which would be indicative of dangerous motion of the occupant relative to the vehicle seat as might occur during an emergency condition.

Having thus described an exemplary embodiment of the present invention including the dual locking mechanism, an integrated weblocker and a programmed pawl, it should now be apparent to those skilled in the art that the various features, objects and advantages of the present invention have been attained by these embodiments and, further, that various modifications, adaptations, and equivalent constructions may be made in view thereof which still fall within the scope and spirit of the present invention. For example, while it is preferable that the programmed pawl feature be included within an exemplary retractor construction, such feature need not be included in order to practice the teaching of the present invention. Further, other translational linkages could be utilized in place of the weblocker actuator in order to effectively translate the moment caused by protractive forces exerted on the safety belt relative to the shaft portion of the reel assembly into translation of the weblocker clamping means into a lock-up condition. Accordingly, the scope of the present invention is defined and limited only by the following claims.

I claim:

1. In an inertia-responsive safety belt locking retractor for a vehicle having a frame mounted to the vehicle, a reel rotatably mounted on the frame having a safety belt webbing wound thereon for protraction and retraction, a multiple toothed ratchet wheel fixedly mounted to said reel, a locking pawl means for engaging the ratchet wheel to prevent protractive rotation of the reel and protraction of the safety belt webbing in an emergency, and a weblocker including clamping means mounted on the frame and having the safety belt webbing passing operably therethrough for selectively clamping the safety belt webbing against further movement relative to the clamping means, the improvement comprising the provision of an improved safety belt webbing protractive force sensing and weblocker actuating means comprising:

a rotatably mounted pawl assembly for carrying said pawl means and having limited rotational movement relative to the retractor frame between deactivated and activated positions, said pawl assembly rotating to the activated position when said locking pawl means is engaged with said ratchet wheel and protractive force is exerted on the safety belt webbing in excess of a predetermined threshold amount, and a weblocker actuator for actuating said weblocker to directly clamp the safety belt webbing passing therethrough against further protraction in response to said pawl assembly rotating to the activated position.

2. An improved dual locking safety belt retractor comprising:

a generally U-shaped frame;

a reel rotatably carried by said frame, said reel having at least one shaft portion journal-mounted by said frame and a toothed ratchet wheel integral therewith;

safety belt webbing wound about said reel such that it may protract and retract;

a pawl assembly including a pawl member for engaging said ratchet wheel and locking said reel against further protractive rotation, said pawl assembly being rotatably mounted on said shaft portion such that it may rotate relative to the retractor frame between activated and deactivated positions;

a biasing spring for biasing said pawl assembly to normally rotate to the deactivated position such that the pawl assembly rotates to the activated position only in response to protractive force on the safety belt webbing when the pawl member is in locking engagement with the ratchet wheel in excess of a preselected threshold at which said forces overcomes the force of the biasing spring and causes said pawl assembly to be rotated to the activated position;

a weblocker actuator for sensing rotation of the pawl assembly to the activated position; and a weblocker mounted to said frame and including clamping means for immediately clamping said safety belt webbing against further protraction from the retractor when actuated by said weblocker actuator;

said weblocker actuator including means for actuating said weblocker to a locking condition thereby clamping said safety belt in response to rotation of the pawl assembly to the activated position.

3. The apparatus of claim 1 or 2 wherein said clamping means comprises:

a wedge-shaped clamp member and means for mounting said clamp member for movement from a webbing disengaging position to a webbing clamping position.

4. The apparatus of claim 3 wherein said clamping means further comprises:

a pair of wedged-shaped clamp members mounted in opposing relationship between a pair of convergent planar surfaces and being slideably mounted with respect thereto such that said clamp members may slide from a spaced-apart webbing-disengaging position to a webbing-engaged position at which said convergent planar surfaces cause said clamp members to move inward with respect to one-another and into gripping relationship with the safety belt passing therebetween, said surfaces being convergent in a direction corresponding with protraction of the safety belt such that further protractive force tends to pull the clamping members into a tighter gripping relationship.

5. The apparatus of claim 4 wherein one clamp member is provided with a groove portion and the other clamp member is provided with a groove-engaging tongue portion such that the pair of clamp members move along the convergent planar surfaces in a constantly-opposed coordinated manner in response to cooperation of the tongue and groove portions and wherein the mutually opposing webbing engaging surfaces of the clamp members are provided with a resilient gripping surface formed of a material having a high coefficient of friction.

6. The apparatus of claim 1 or 2 wherein said pawl assembly and reel further include programming means for causing said pawl member to engage said ratchet wheel in a programmed manner, said programming means including a programming pawl carried by said pawl assembly and formed of an elastomeric material, a toothed program ratchet wheel fixedly mounted to the shaft portion of the reel and engaged by the programming pawl, and pawl lifting means for causing the pawl member to engage the toothed ratchet wheel in a programmed manner in response to the engagement of the programming pawl with the program ratchet wheel.

7. The apparatus of claim 6 wherein said pawl assembly further includes a frame upon which is pivotally mounted the pawl member and the programming pawl, said frame being journal-mounted to a shaft portion of the reel such that it has a limited coaxial rotation with respect to both the reel and the retractor frame between said activated and deactivated positions, and said programming pawl is further provided with a cut-out and said pawl member is further provided with a tongue portion operably extending into said cut-out, whereby engagement of said programming pawl with one of the multiple teeth of the program ratchet wheel and a subsequent slight protractive rotation of the reel causes an extended radially-inward rotation of the programming pawl about its pivot which causes the tongue portion to be engaged and lifted by the cut-out thereby causing the pawl member to be pivoted radially inward with respect to the reel into engagement with the ratchet wheel in a programmed manner.

8. The apparatus of claim 6 wherein said programming pawl and said program ratchet wheel are formed of a deformable elastomeric material.

9. An improved dual-locking safety belt retractor having a generally U-shaped frame, a reel rotatably carried by said frame, said reel having at least one shaft portion journal-mounted by said frame and a toothed ratchet wheel integral therewith, safety belt webbing wound about said reel such that it may protract and retract, and the improvement comprising:

a vehicle inertia-responsive safety belt locking means for restraining the safety belt against protraction by locking the reel against protractive rotation in response to vehicle acceleration or deceleration in excess of a pre-selected amount, said means including a pawl assembly, a pawl member mounted to the pawl assembly and responsive to vehicle inertia sensing means for engaging said ratchet wheel and locking said reel against further protractive rotation when a pre-selected level of inertial force is exerted on said inertia sensing means; and a safety belt protractive moment-responsive locking means for restraining said safety belt against protraction including rotational mounting means for mounting said pawl assembly such that it may have a limited rotation relative to the frame between activated and deactivated positions, a biasing spring for biasing said pawl assembly to normally rotate to the deactivated position such that the pawl assembly rotates to the activated position only when the vehicle inertia-responsive safety belt locking means is in a locked condition and in response to a protractive moment exerted on the reel by a protractive force on the safety belt webbing in excess of a second pre-selected threshold at which said moment overcomes the biasing spring and causes said pawl assembly to be rotated to the activated position, a weblocker actuator for sensing rotation of the pawl assembly to the activated position, and a weblocker mounted to said frame and including clamping means for immediately clamping said safety belt webbing against further protraction from the retractor when actuated by said weblocker actuator, said weblocker actuator including means for actuating said weblocker to a locking condition thereby clamping said safety belt in response to rotation of the pawl assembly to the activated position.

10. The improved dual locking safety belt retractor of claim 9 wherein said clamping means includes one or more wedge-shaped clamp members for clamping directly on the safety belt webbing and wherein said weblocker actuator has one end in operative engagement with at least one of said one or more wedge shaped clamp members and the other end in operative engagement with said pawl assembly for sensing rotation thereof whereby rotation of said pawl assembly to the activated position causes said weblocker actuator to engage and actuate said one or more wedge shaped clamp members to directly clamp said safety belt webbing.

* * * * *